US007523000B2

(12) United States Patent
Tengler et al.

(10) Patent No.: US 7,523,000 B2
(45) Date of Patent: Apr. 21, 2009

(54) VEHICLE PRE-COLLISION COUNTERMEASURE SYSTEM

(75) Inventors: Steve Tengler, Grosse Pointe Park, MI (US); Ronald Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 94 days.

(21) Appl. No.: 11/246,173

(22) Filed: Oct. 11, 2005

(65) Prior Publication Data

US 2007/0244643 A1 Oct. 18, 2007

(51) Int. Cl.
*B60W 30/08* (2006.01)
*G08G 1/16* (2006.01)
*G06F 17/00* (2006.01)

(52) U.S. Cl. .......................... 701/301; 701/70; 701/93; 701/96; 701/200; 701/207; 701/208; 701/213; 701/300; 340/901; 340/902; 340/903; 340/435; 340/436; 455/450; 455/451; 455/452.1; 455/452.2; 455/509; 455/512; 455/521; 455/63.3; 370/229; 370/233; 370/234; 370/235

(58) Field of Classification Search .................... 701/1, 701/70, 93, 96, 200, 207, 208, 213, 300, 701/301; 340/901–903, 988, 435, 436; 455/450–452.2, 455/509, 512, 521, 63.3; 370/229, 233–235
See application file for complete search history.

(56) References Cited

U.S. PATENT DOCUMENTS

| | | | | |
|---|---|---|---|---|
| 5,589,838 | A * | 12/1996 | McEwan | 342/387 |
| 5,983,161 | A * | 11/1999 | Lemelson et al. | 701/301 |
| 6,037,860 | A * | 3/2000 | Zander et al. | 340/436 |
| 6,252,544 | B1 * | 6/2001 | Hoffberg | 342/357.1 |
| 6,275,773 | B1 * | 8/2001 | Lemelson et al. | 701/301 |
| 6,278,360 | B1 * | 8/2001 | Yanagi | 340/436 |
| 6,615,137 | B2 * | 9/2003 | Lutter et al. | 701/301 |
| 6,707,378 | B2 * | 3/2004 | MacNeille et al. | 340/435 |
| 6,791,471 | B2 * | 9/2004 | Wehner et al. | 340/903 |

(Continued)

FOREIGN PATENT DOCUMENTS

JP 2005032010 * 3/2005

OTHER PUBLICATIONS

Vehicle Safety Communications Project, TASK 3 Final Report; Mar. 2005; National Highway Traffic Safety Administration, U.S. Department of Transportation, Washington, D.C., U.S.A.

(Continued)

*Primary Examiner*—Jack W. Keith
*Assistant Examiner*—Chuong P Nguyen
(74) *Attorney, Agent, or Firm*—Global IP Counselors, LLP

(57) ABSTRACT

A vehicle pre-collision countermeasure system is provided has a communication component, a rear collision predicting component and an acceleration countermeasure component. The communication component conducts a direct communications with other vehicles, including broadcasting vehicle parameter identifiers of a host vehicle equipped with the communication component and receiving vehicle parameter identifiers of a following vehicle. The rear collision predicting component predicts a likelihood of a potential rear collision event occurring in the host vehicle based on the vehicle parameter identifiers of the following vehicle. The acceleration countermeasure component accelerates the host vehicle in response to the rear collision predicting component predicting that the potential rear collision event is likely to occur with the following vehicle.

47 Claims, 5 Drawing Sheets

U.S. PATENT DOCUMENTS

| | | | | |
|---|---|---|---|---|
| 6,831,572 | B2 * | 12/2004 | Strumolo et al. | 340/903 |
| 2003/0141966 | A1 * | 7/2003 | Strumolo et al. | 340/435 |
| 2003/0149530 | A1 * | 8/2003 | Stopczynski | 701/301 |
| 2004/0005898 | A1 * | 1/2004 | Kato et al. | 455/450 |
| 2004/0145496 | A1 * | 7/2004 | Ellis | 340/905 |
| 2004/0192320 | A1 * | 9/2004 | Khawand et al. | 455/452.1 |
| 2004/0230345 | A1 * | 11/2004 | Tzamaloukas | 701/1 |
| 2005/0088318 | A1 * | 4/2005 | Liu et al. | 340/902 |
| 2006/0173621 | A1 * | 8/2006 | Stopczynski | 701/301 |
| 2007/0197230 | A1 * | 8/2007 | Roggero et al. | 455/456.1 |

OTHER PUBLICATIONS

Qing Xu et al., "Vehicle-to-Vehicle Safety Messaging in DSRC", International Conference on Mobile Computing and Networking, Oct. 1, 2004, p. 19-28, ACM, NY, USA.

* cited by examiner

VEHICLE PRE-COLLISION COUNTERMEASURE SYSTEM

BACKGROUND OF THE INVENTION

1. Field of the Invention

The present invention generally relates to a vehicle pre-collision countermeasure system. More specifically, the present invention relates to a vehicle using a vehicle to vehicle communication system to avoid a rear collision by accelerating the forward vehicle.

2. Background Information

Recently, vehicles are being equipped with a variety of informational systems such as navigation systems, Sirius and XM satellite radio systems, two-way satellite services, built-in cell phones, DVD players and the like. These systems are sometimes are interconnected for increased functionality. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

Accordingly, DSRC technology can be used to provide various information between vehicles, such as providing GPS location, vehicle speed and other vehicle Parameter Identifiers (PIDs) including engine speed, engine run time, engine coolant temperature, barometric pressure, etc. When communications are established from one vehicle to other vehicles in close proximity, this information would be communicated between the vehicles to provide the vehicles with a complete understanding of the vehicles in the broadcast area. This information then can be used by the vehicles for both vehicle safety applications and non-safety applications.

In vehicle safety applications, a “Common Message Set” (CMS) would mostly likely be developed in which a prescribed set of vehicle Parameter Identifiers (PIDs) are broadcast by each vehicle to give relevant kinematical and location information such as GPS location/vehicle position, vehicle speed, vehicle dimensions etc. Once a potential safety concern is determined to exist, a warning system in the vehicles would notify the driver of the potential safety concern so that the driver can take the appropriate action.

In view of the above, it will be apparent to those skilled in the art from this disclosure that there exists a need for an improved vehicle pre-collision countermeasure system. This invention addresses this need in the art as well as other needs, which will become apparent to those skilled in the art from this disclosure.

SUMMARY OF THE INVENTION

It has been discovered that wireless communications between vehicles can be used in to initiate various vehicle pre-collision countermeasures. However, the previously proposed collision countermeasure systems do not attempt to control the host vehicle in order to avoid an impending rear collision. More specifically, it has been discovered that vehicle to vehicle communications can be used to avoid a rear collision by accelerating the forward vehicle.

The present invention was conceived in view of the above mentioned developments in vehicles and wireless communications. One object of the present invention is to provide a vehicle pre-collision countermeasure system in which a host vehicle equipped communications accelerate the host vehicle in response to a prediction that a potential rear collision event is likely to occur with a following vehicle.

In order to achieve the object, the present invention provides a vehicle pre-collision countermeasure system is provided that comprises a communication component, a rear collision predicting component and an acceleration countermeasure component. The communication component is configured to conduct a direct communications with other vehicles, including broadcasting vehicle parameter identifiers of a host vehicle equipped with the communication component and receiving vehicle parameter identifiers of a following vehicle. The rear collision predicting component is configured to predict a likelihood of a potential rear collision event occurring in the host vehicle based on the vehicle parameter identifiers of the following vehicle. The acceleration countermeasure component is configured to accelerate the host vehicle in response to the rear collision predicting component predicting that the potential rear collision event is likely to occur with the following vehicle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
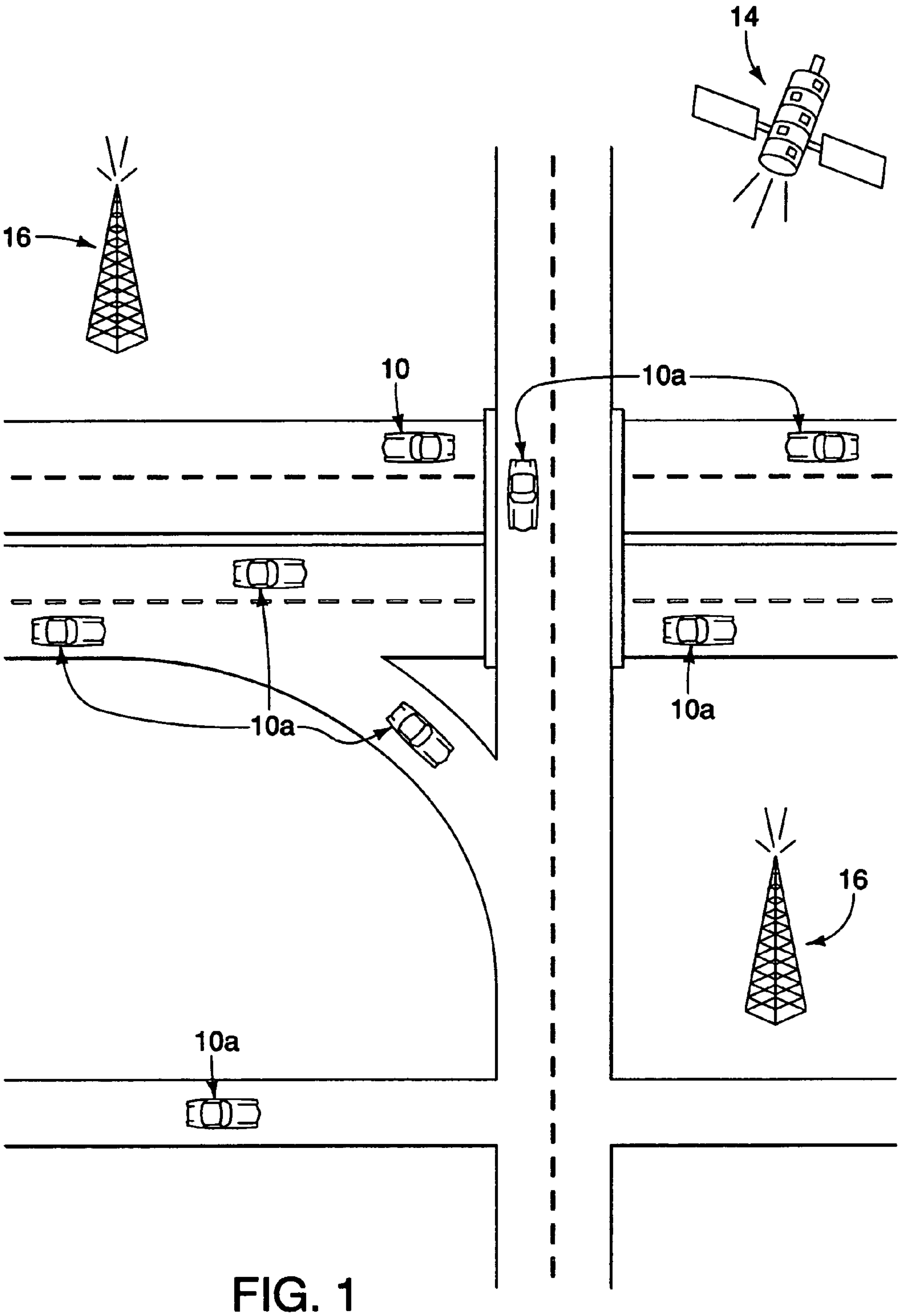
FIG. 1 is a pictorial representation of a two-way wireless communications (DSRC) network showing a plurality of vehicles equipped with each being equipped with an on-board unit capable of conducting two-way wireless communications in accordance with the present invention.
Figure 2:
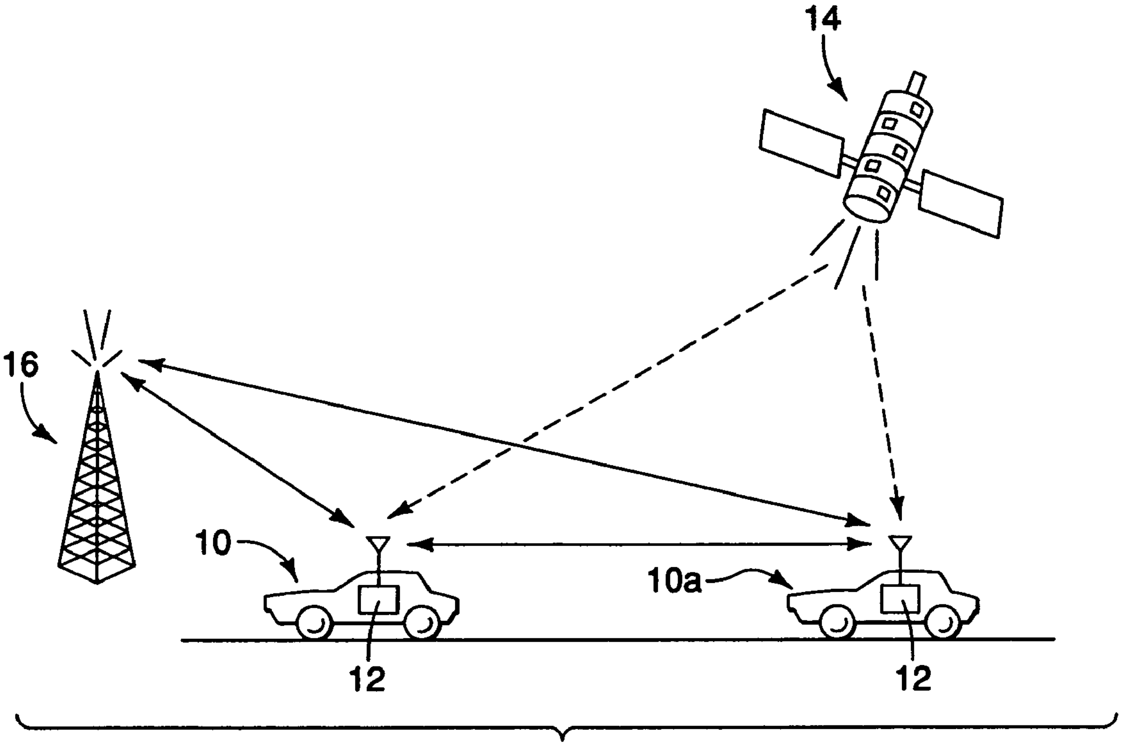
FIG. 2 is a pictorial representation of a two-way wireless communications (DSRC) network showing a pair of vehicles broadcasting vehicle parameter identifiers and receiving information from a satellite and/or a roadside unit in accordance with the present invention.

Referring initially to FIGS. 1 and 2, a two-way wireless communications network is illustrated in which a host vehicle 10 and several neighboring or nearby vehicles 10*a* are each equipped with a vehicle pre-collision countermeasure system 12 in accordance with a preferred embodiment of the present invention. The two-way wireless communications network also includes one or more global positioning satellites 14 (only one shown) and one or more roadside units 16 (only two shown) that send and receive signals to and from the vehicles 10 and 10*a*. In this system, the term "host vehicle" refers to a vehicle among a group of DSRC equipped vehicles or vehicles equipped with two-way wireless communications in which a pre-collision countermeasure is carried out in accordance with the present invention. The term "forward vehicle" or "preceding vehicle" refers to a vehicle equipped with two-way wireless communications that is directly in front of the host vehicle (no intervening vehicles therebetween), while the term "following vehicle" refers to a vehicle equipped with two-way wireless communications that is directly behind the host vehicle (no intervening vehicles therebetween). The term "neighboring vehicle" refers to vehicles equipped with two-way wireless communications that are located within a communication (broadcasting/receiving) area surrounding the host vehicle in which the host vehicle is capable of either broadcasting a signal to another vehicle within a certain range and/or receiving a signal from another vehicle within a certain range.

As explained below, the vehicle pre-collision countermeasure system 12 of the host vehicle 10 is configured and arranged to communicate with other DSRC equipped vehicles 10*a* so that when a following vehicle is equipped with DSRC, the vehicle pre-collision countermeasure system 12 of the host vehicle 10 accelerates the host vehicle 10 based on vehicle parameter identifiers communicated by the following vehicle 10*a*, as seen in FIG. 2, to avoid a potential rear collision event. Thus, in order to accelerate the host vehicle, the throttle opening of a main throttle valve 18 is adjusted or controlled electrically by the vehicle pre-collision countermeasure system 12. A "rear collision" as used herein is defined as an on-road, two vehicle collision in which both vehicles are moving forward in the same direction prior to the collision or a collision in which the vehicle in the forward path has stopped. The vehicle pre-collision countermeasure system 12 of the present invention attempts to control the host vehicle in order to avoid an impending rear collision.

As seen in FIG. 2, the vehicle pre-collision countermeasure system 12 of each of the vehicles 10 and 10*a* carries out two-way wireless communications between each other as well as with one or more global positioning satellites 14 (only one shown) and one or more roadside units 16 (only one shown). The global positioning satellites 14 and the roadside units 16 are conventional components that are known in the art. The roadside units 16 are be equipped with a DSRC unit for broadcasting and receiving signals to the vehicles 10 located with communication (broadcasting/receiving) regions surrounding the roadside units 16. Since global positioning satellites and roadside units are known in the art, the structures of the global positioning satellites 14 and the roadside units 16 will not be discussed or illustrated in detail herein. Rather, it will be apparent to those skilled in the art from this disclosure that the global positioning satellites 14 and the roadside units 16 can be any type of structure that can be used to carry out the present invention.

Figure 3:
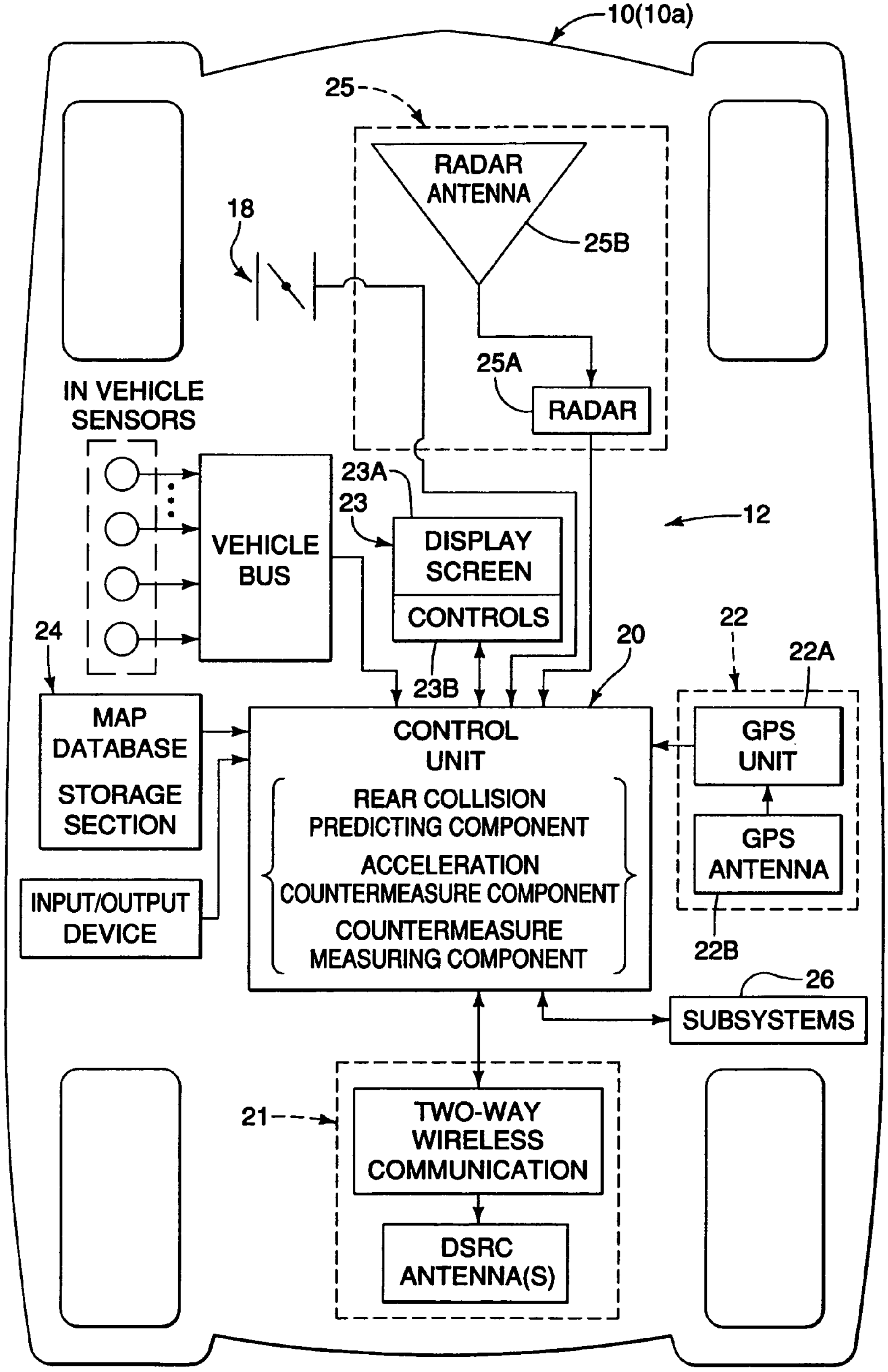
FIG. 3 is a schematic representation of one of the vehicles that is equipped with the on-board unit for conducting two-way wireless communications in accordance with the present invention.

Referring now to FIG. 3, the vehicle pre-collision countermeasure system 12 is a vehicle on-board unit (OBU) that basically includes a controller or control unit 20, a two-way wireless communications system 21, a global positioning system 22, a navigation system 23, a map database storage section or component 24, and a forward obstacle detection component or system 25. These systems or components are configured and arranged such that the control unit 20 receives and/or sends various signals to the other component and systems to determine a likelihood of a potential rear collision event occurring in the host vehicle 10. In particular, the control unit 20 is configured and/or programmed to carry out this process by executing the steps shown in the flow chart of FIG. 4 (discussed below) in conjunction with various signals to and from the other components and systems. It will be apparent to those skilled in the art from this disclosure that the neighboring or nearby vehicles 10*a* are also equipped in the same manner as the host vehicle 10 and perform the same processes as described herein.

The control unit 20 preferably includes a microcomputer with a pre-collision countermeasure control program that controls the main throttle valve 18 to accelerate the host vehicle 10 in response to a prediction that a potential rear collision event is likely to occur with the following vehicle 10*a*. The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communications system 21, the global positioning system 22, the navigation system 23, the map database storage section 24, and the forward obstacle detection component 25 that are run by the processor(s). The control unit 20 is capable of selectively controlling any of the components of the vehicle pre-collision countermeasure system 12 as needed and/or desired. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 20 preferably includes a program that has a rear collision predicting component or section, an acceleration countermeasure component or section and a countermeasure prohibiting component or section. Based on various signals from the two-way wireless communications system 21, the global positioning system 22, the navigation system 23, the map database storage section 24, and the forward obstacle detection component 25, these components or sections will predict if a potential rear collision event is likely to occur in the host vehicle and then determine if countermeasures should be employed. Basically, the rear collision predicting component is configured to predict a likelihood of a potential rear collision event occurring in the host vehicle 10 based on the vehicle parameter identifiers of the following vehicle 10*a*. The acceleration countermeasure component is configured to accelerate the host vehicle 10 in response to the rear collision predicting component predicting that the potential rear collision event is likely to occur with the following vehicle 10*a*. However, the countermeasure prohibiting component is configured to prohibit the acceleration countermeasure component from accelerating the host vehicle in response to the rear collision predicting component predicting that the potential rear collision event is likely to occur.

The two-way wireless communications system 21 includes communication interface circuitry that connects and exchanges information with a plurality of the vehicles 10 that are similarly equipped as well as with the roadside units 16 through a wireless network within the broadcast range of the host vehicle 10. The two-way wireless communications system 21 is configured and arranged to conduct direct two way communications between vehicles (vehicle-to-vehicle communications) and roadside units (roadside-to-vehicle communications). Moreover, two-way wireless communications system 21 is configured to periodically broadcast a signal in the broadcast area. The two-way wireless communications system 21 is an on-board unit that has both an omni-directional antenna and a multi-directional antenna.

In particular, the two-way wireless communications system 21 is preferably a dedicated short range communications systems, since the latency time between communications is very low compared to most other technologies that are currently available. However, other two-way wireless communications systems can be used if they are capable of conducting both point-to-point wireless communications and broadcast wireless messages in a limited broadcast area so log as the latency time between communications is short enough. When the two-way wireless communications system 21 is a DSRC system, the two-way wireless communications system 21 will transmit at a 75 Mhz spectrum in a 5.9 GHz band with a data rate of 1 to 54 Mbps, and a maximum range of about 1,000 meters. Preferably, the two-way wireless communications system 21 includes seven (7) non-overlapping channels. The two-way wireless communications system 21 will be assigned a Medium Access Control (MAC) address and/or an IP address so that each vehicle in the network can be individually identified.

The two-way wireless communications system 21 is configured to periodically broadcast a standard or common message set (CMS) to the neighboring or nearby vehicles 10*a* and the nearby roadside units 16 that within a prescribed broadcast range of the host vehicle 10. This common message set (CMS) would mostly likely be developed such that all of the DSRC equipped vehicles 10 and 10*a* would transmit the same type of vehicle parameter identifiers to give relevant kinematical and location information. In other words, preferably a standardized DSRC message set and data dictionary would be established for safety applications that utilize vehicle-to-vehicle and/or vehicle-to-infrastructure communications. For example, the common message set can include preset vehicle parameter identifiers, such as a MAC address, an IP address and/or a vehicle ID number, and variable vehicle parameter identifiers indicative of vehicle location and movement such as a GPS location/vehicle position (longitude, latitude and elevation) with a GPS time stamp, a vehicle heading, and/or a vehicle speed. As explained later, the two-way wireless communications system 21 is also configured to broadcast a full kinematics message to the following vehicle 10*a* when a possibility of a rear collision is determined. This full kinematics message can include the data of the common message set as well as additional relevant kinematics information such as a vehicle type/class, a vehicle size (length, width and weight), a vehicle acceleration, a vehicle brake position, a vehicle throttle position, a vehicle steering wheel angle, etc.

Generally, the vehicle parameter identifiers are received and processed by the control unit 20 to predict whether or not a potential rear collision event is likely to occur. This determination of a potential rear collision event can be done in either the host vehicle 10 or the following vehicle 10*a*. If the determination of a potential rear collision event is done in the following vehicle 10*a*, then the determination of a potential rear collision event transmitted to the host vehicle 10. Thus, the control unit 20 will determine prior to impact the severity, the location and type of the collision. This information can be used by the control unit 20 to regulate the main throttle valve 18 to accelerate when possible. In addition to or instead of accelerating the vehicle, other countermeasures can be implemented. For example, some of these additional collision counter measures can include preparation of deployment of the air bags, seat-belt pre-tensioning, occupant repositioning, bumper extension for increased frontal crush zone, and others. Thus, the control unit 20 activates various vehicle subsystems 26 in a coordinated effort to mitigate occupant injuries during a collision based on the information received. Preferably, these countermeasures are activated just before a collision (200 ms to 800 ms).

The global positioning system 22 is a conventional global positioning system that is configured and arranged to receive global positioning information of the host vehicle in a conventional manner. Basically, the global positioning system 22 includes a GPS unit 22A that is a receiver for receiving a signal from the global positioning satellite 18 via and a GPS antenna 22B. The signal transmitted from the global positioning satellite 18 is received at regular intervals (e.g. one second) to detect the present position of the host vehicle. The GPS unit 22A preferably has an accuracy of indicting the actual vehicle position within a few meters or less. This data (present position of the host vehicle) is fed to the control unit 20 for processing and to the navigation system 23 for processing.

The navigation system 23 is a conventional navigation system that is configured and arranged to receive global positioning information of the host vehicle in a conventional manner. Basically, the navigation system 23 includes a color display unit 23A and an input controls 23B. The navigation system 23 can have its own controller with microprocessor and storage, or the processing for the navigation system 23 can be executed by the control unit 20. In either case, the signals transmitted from the global positioning satellites 14 are utilized to guide the vehicle 10 in a conventional manner.

The map database storage section 24 configured to store road map data as well as other data that can be associated with the road map data such as various landmark data, fueling station locations, restaurants, etc. The map database storage section 24 preferably includes a large-capacity storage medium such as a CD-ROM (Compact Disk-Read Only Memory) or IC (Integrated Circuit) card. The map database storage section 24 is configured to perform a read-out operation of reading out data held in the large-capacity storage medium in response to an instruction from the control unit 20 and/or the navigation system 23. The map database storage section 24 is used by the control unit 20 to acquire the map information necessary as needed and or desired for use in predicting a collision. The map database storage section 24 is also used by the navigation system 23 to acquire the map information necessary for route guiding, map display, and direction guide information display. Preferably, the map information of this embodiment includes at least information necessary for offering of the map information and route guiding as performed by a general navigation device and necessary for displaying the direction guide information of the embodiment. The map information also includes at least road links indicating connecting states of nodes, locations of branch points (road nodes), names of roads branching from the branch points, and place names of the branch destinations, and has such a data structure that, by specifying a location of interest, information on the corresponding road and place name can be read. The map information of the map database storage section 24 stores road information for each road link or node. The road information for each road link or node includes identification information of a road such as a road name, attribute information (road type—local road, unrestricted access, restricted access, bridge, tunnel, roundabout, etc.), a road width or number of lanes, a connection angle of a road at a branch point, and etc, Since it is desirable to have the position information, as accurate as possible for the vehicles 10 and 10*a*, the global positioning system 22 can be use together with the navigation system 23 and/or the map database storage section 24 to enhance the accuracy of the data.

The forward obstacle detection component 25 is configured to determine if an obstacle exists in front of the host vehicle 10. The forward obstacle detection component 25 will typically use a forward-looking sensor or radar 25A with a radar antenna or receiver 25B mounted at the front of the host vehicle 10 that detects targets (other vehicles or objects) ahead of the host vehicle 10 and in its field of view. An accurate prediction of the forward lane geometry ahead of the host vehicle 10 (up to 150 meters) is desirable to properly classify the targets as in-path or out-of-path, and thereby identify potential threats of rear collision. The forward obstacle detection component 25*a* can also be provided with a CCD camera, a laser detector or the like to detect other preceding vehicles.

The forward obstacle detection component 25 preferably uses a vehicle detecting device having a range of coverage 150 meters and that is capable of track updates at an update rate of 100 ms. Thus, the two-way wireless communications system 21 is preferably configured to provide an updated broadcast of the common message set at least at 100 ms intervals such that vehicle-to-vehicle communication occurs every 100 ms between vehicles at least 150 m. Most likely, the broadcast range will be limited to about 1000 m to avoid receive too many signals that are not likely to provide relevant safety information. Radar appears to adequately meet these preferred criteria.

Figure 4:
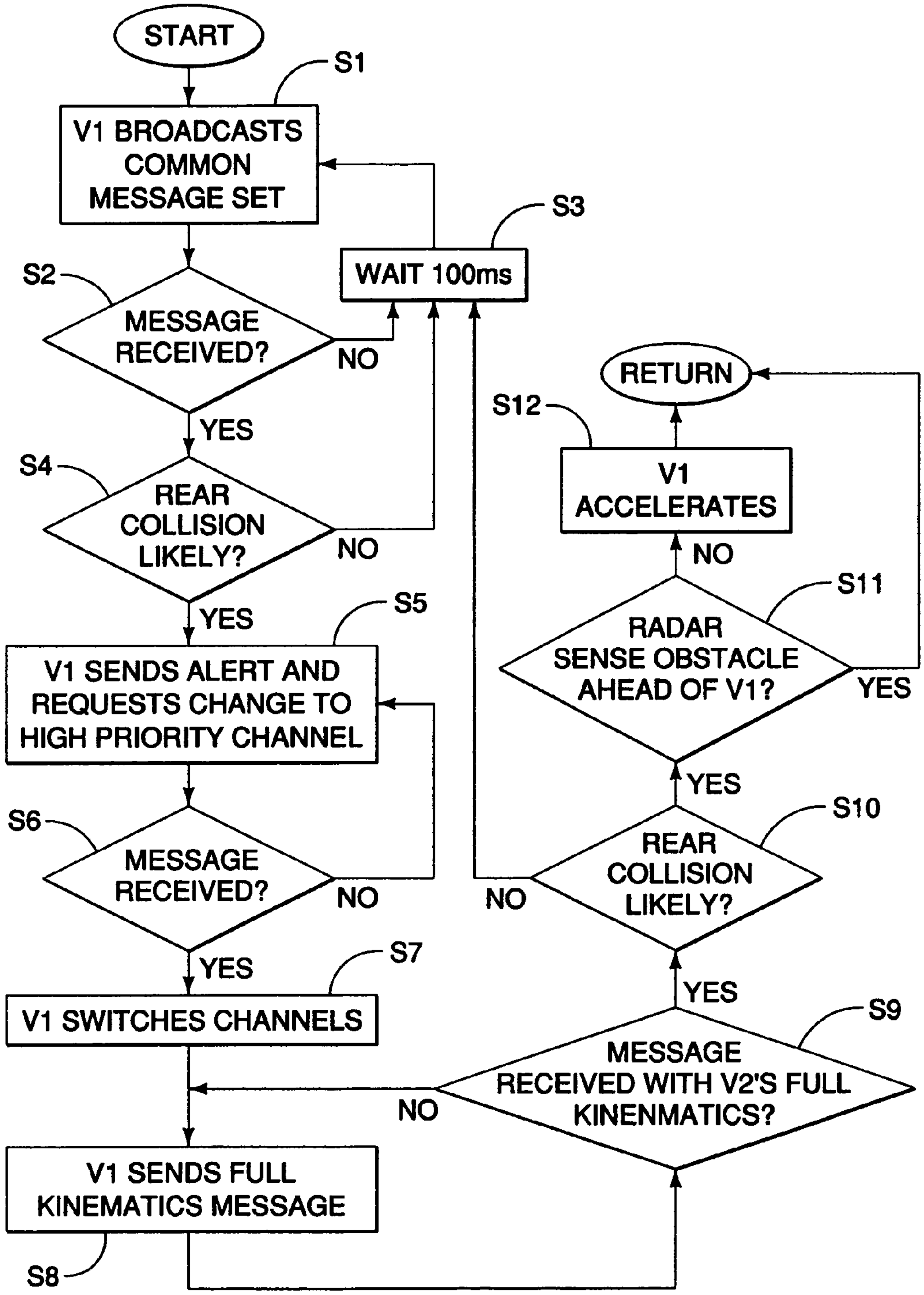
FIG. 4 is a first flow chart illustrating the processing executed by the control unit to determine whether to accelerate the vehicle to avoid a potential collision in accordance with the present invention.

Referring now to FIG. 4, one possible process that can be executed by the control unit 20 to carry out the present invention will now be discussed. This process is limited to the control of the main throttle valve 18. However, it will be apparent to those skilled in the art from this disclosure that the control unit 20 simultaneously executes other countermeasure programs as need and/or desired. In the flow chart of FIG. 4, the term "V1" refers to the host vehicle 10, while the term "V2" refers to the following vehicle or neighboring vehicle 10*a* that is directly behind the host vehicle 10.

In step S1, the control unit 20 is configured to instruct the two-way wireless communications system 21 of the host vehicle V1 to broadcast the common message set that includes the current vehicle parameter identifiers, as discussed above, as well as its MAC address and/or IP address. Then the processing executed by the control unit 20 of the host vehicle V1 proceeds to step S2.

In step S2, the control unit 20 is configured to determine if signal with a common message set has been received by the two-way wireless communications system 21 of the host vehicle V1 from a broadcast signal of one of the neighboring vehicles V2. The common message set of the neighboring vehicles V2 includes the current vehicle parameter identifiers of the neighboring vehicles V2, respectively, as discussed above, as well as its MAC address and/or IP address. If a common message set has not been received from one of the neighboring vehicles V2, then the processing executed by the control unit 20 proceeds to step S3.

In step S3, the processing executed by the control unit 20 pauses for a prescribed period of time such as 100 ms before returning to step S1. However, if a common message set has been received from a broadcast signal of one of the neighboring vehicles V2 by the two-way wireless communications system 21 of the host vehicle V1, then the processing executed by the control unit 20 proceeds to step S4.

In step S4, the control unit 20 is configured to analyze the common message set that has been received by the two-way wireless communications system 21 of the host vehicle V1 to determine if a rear collision is likely to occur. In other words, the control unit 20 of the host vehicle V1 determines if the common message set is from a following vehicle V2 and whether the current vehicle parameter identifiers of the following vehicle V2 indicates a likelihood that the following vehicle V2 will collide with the rear end of the host vehicle V1. If the control unit 20 of the host vehicle V1 determines that a rear collision is unlikely to occur from the common message set of the following vehicle V2, then the processing executed by the control unit 20 proceeds to step S3, where the processing executed by the control unit 20 pauses for a prescribed period of time before returning to step S1. However, if the control unit 20 of the host vehicle V1 determines that a rear collision will likely occur from the common message set of the following vehicle V2, then the processing executed by the control unit 20 proceeds to step S5.

In step S5, the control unit 20 is configured to send a signal from the host vehicle V1 to the following vehicle V2 to alert the following vehicle V2 of a potential collision and to request a switch from a regular broadcast channel to a high priority channel that conducts direct vehicle-to-vehicle between the host vehicle V1 and the following vehicle V2. This high priority channel is preferably configured to conduct communications at a faster rate and/or with less interference. For example, a direct communication link can be established in an emergency channel or a private channel. If a private channel is used, a handshaking procedure or some other procedure can be executed between the host vehicle V1 and the following vehicle V2 to establish a private connection. In any event, the processing executed by the control unit 20 then proceeds to step S6.

In step S6, the control unit 20 is configured to determine if the signal requesting a switch from a regular broadcast channel to a high priority channel has been received by the following vehicle V2. In particular, the on-board unit of the following vehicle V2 should send a signal with its MAC address and/or IP address together with a confirmation message to the host vehicle V1. The on-board unit of the following vehicle V2 should also switch to an emergency channel or a private channel. Normally the protocol for which channel to be established will be preset in advance. However, the following vehicle V2 can indicate in the signal which channels is to be used for the subsequent communications. If the host vehicle V1 does not receive this confirmation message from the following vehicle V2, then the control unit 20 repeats the process of step S5, i.e., sending the signal requesting a switch from a regular broadcast channel to a high priority channel has been received by the following vehicle V2. Once the host vehicle V1 receives the confirmation message from the following vehicle V2, then the processing executed by the control unit 20 proceeds to step S7.

In step S7, the control unit 20 is configured to switch from the regular broadcast channel of the two-way wireless communications system 21 to a high priority channel, which the following vehicle V2 should now be using. Now the processing executed by the control unit 20 proceeds to step S8.

In step S8, the control unit 20 is also configured to send a full kinematics message which provides a complete set of information on the host vehicle V1 to the following vehicle V2. Thus, the on-board unit of the following vehicle V2 can now perform its countermeasures as need and/or desired. Now the processing executed by the control unit 20 proceeds to step S9.

In step S9, the control unit 20 is configured to determine if the signal including the full kinematics message has been received by the following vehicle V2. In particular, the on-board unit of the following vehicle V2 should send a signal with its MAC address and/or IP address together with a confirmation message to the host vehicle V1. The following vehicle V2 should also include a full kinematics message of following vehicle V2. If the host vehicle V1 does not receive this confirmation message with the full kinematics message from the following vehicle V2, then the control unit 20 repeats the process of step S7, i.e., resending the full kinematics message of the host vehicle V1. Once the host vehicle V1 receives the confirmation message a full kinematics message from the following vehicle V2, then the processing executed by the control unit 20 proceeds to step S10.

In step S10, the control unit 20 is configured to analyze the full kinematics message from the following vehicle V2 that has been received by the two-way wireless communications system 21 of the host vehicle V1 to determine if a rear collision is likely to occur. In other words, the control unit 20 of the host vehicle V1 determines if the full kinematics message from the following vehicle V2 indicates a likelihood that the following vehicle V2 will collide with the rear end of the host vehicle V1. It will be apparent to those skilled in the art from this disclosure that step S10 can be eliminated and that the prediction of whether a rear collision is likely to occur can be based on merely step S4 (depending on the information in the common message set) or based on a prediction made by the following vehicle V2 as seen in the flow chart of FIG. 5.

If the control unit 20 of the host vehicle V1 determines in step S10 that a rear collision is unlikely to occur, then the processing executed by the control unit 20 proceeds back to step S3, where the control unit 20 starts over the broadcasting of the common message set by the host vehicle V1 after a prescribed waiting period. However, if the control unit 20 of the host vehicle V1 determines that a rear collision will likely occur, then the processing executed by the control unit 20 proceeds to step S11.

In step S11, the control unit 20 is configured to determine if an obstacle is present in front of the host vehicle V1 that would present a problem if the host vehicle V1 were accelerated in order to prevent a potential rear collision. If the control unit 20 of the host vehicle V1 determines that an obstacle is present in front of the host vehicle V1 that would present a problem if the host vehicle V1 were accelerated, then the processing executed by the control unit 20 is returns to the beginning and other countermeasures will be executed if needed and/or desired. However, if the control unit 20 of the host vehicle V1 determines that no obstacles are present in front of the host vehicle V1 that would present a problem if the host vehicle V1 were accelerated, then the processing executed by the control unit 20 proceeds to step S12.

In step S12, the control unit 20 is configured to open the main throttle valve 18 to accelerate the host vehicle V1 to a level that will be sufficient to avoid a rear collision based on the full kinematics messages of the host vehicle V1 and the following vehicle V2. Then, the processing executed by the control unit 20 returns to the beginning.

Figure 5:
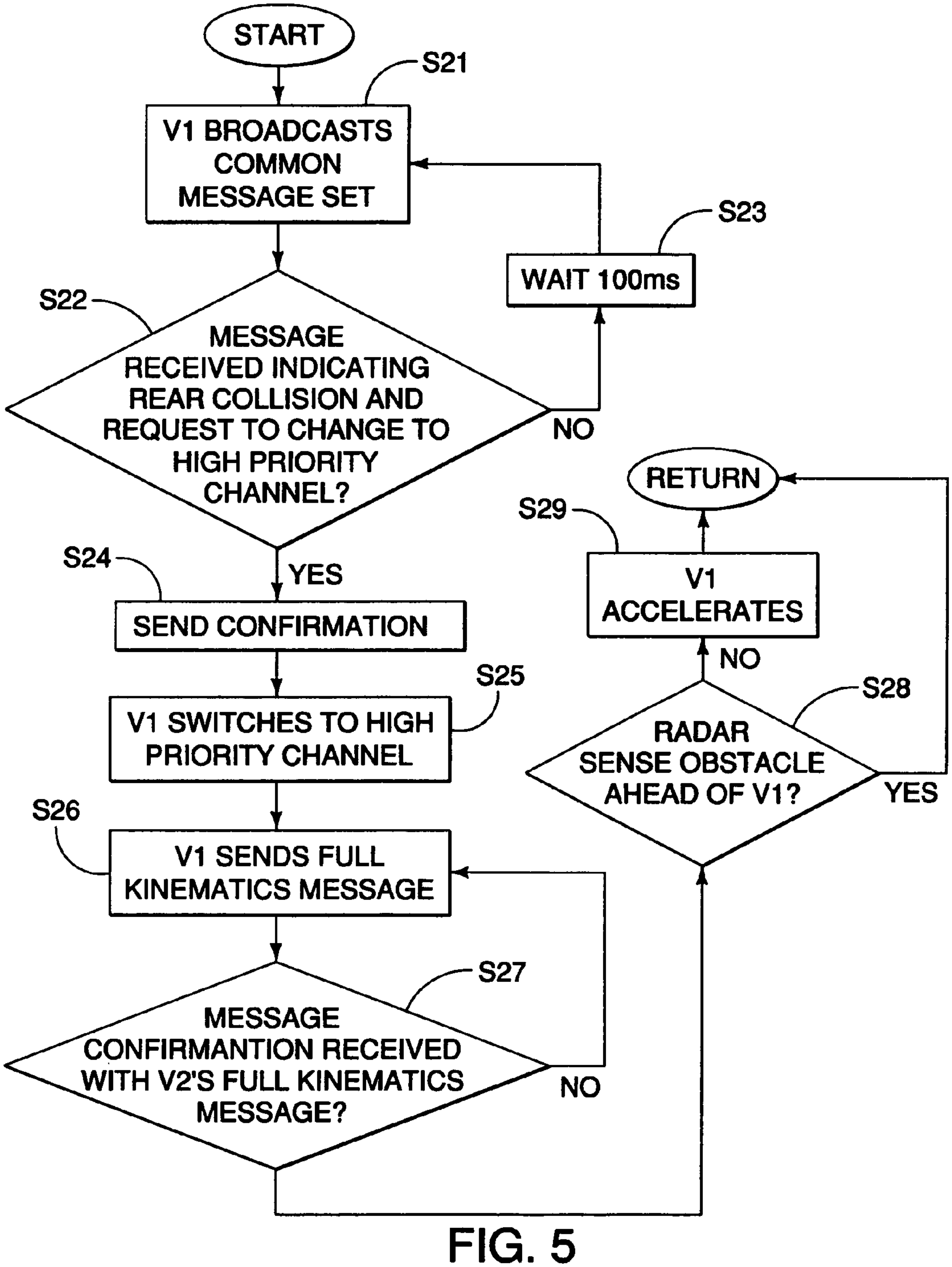
FIG. 5 is a second flow chart illustrating the processing executed by the control unit to determine whether to accelerate the vehicle to avoid a potential collision in accordance with the present invention.

Referring now to FIG. 5, another possible process that can be executed by the control unit 20 to carry out the present invention will now be discussed. This process is limited to the control of the main throttle valve 18. However, it will be apparent to those skilled in the art from this disclosure that the control unit 20 simultaneously executes other countermeasure programs as need and/or desired. In the flow chart of FIG. 5, the term "V1" refers to the host vehicle 10, while the term "V2" refers to the following vehicle or neighboring vehicle 10*a* that is directly behind the host vehicle 10.

In step S21, the control unit 20 is configured to instruct the two-way wireless communications system 21 of the host vehicle V1 to broadcast the common message set that includes the current vehicle parameter identifiers, as discussed above, as well as its MAC address and/or IP address. Then the processing executed by the control unit 20 of the host vehicle V1 proceeds to step S22.

In step S22, the control unit 20 is configured to determine if signal with a message indicating a possible read-end collision might occur has been received by the two-way wireless communications system 21 of the host vehicle V1 from a broadcast signal of the following vehicle V2. The message from the following vehicle V2 includes the common message set of the following vehicle V2, as discussed above, as well as its MAC address and/or IP address and an indication of whether a rear collision is likely to occur based on the common message set of the host vehicle V1 and the full kinematics of the following vehicle V2. Thus, in this processing, the control unit of the following vehicle V2 is configured to analyze the common message set of the host vehicle V1 and its own kinematics to determine if a rear collision is likely to occur with the host vehicle V1. Moreover, the following vehicle V2 is configured to send a signal from to request the host vehicle V1 to switch from a regular broadcast channel to a high priority channel that conducts direct vehicle-to-vehicle between the host vehicle V1 and the following vehicle V2.

If a message indicating a possible read-end collision has not been received from the following vehicle V2, then the processing executed by the control unit 20 proceeds to step S23. In other words, if the control unit of the following vehicle V2 determines or predicts that a rear collision is unlikely to occur, then the host vehicle V1 will not receive an indication of a rear collision so the processing executed by the control unit 20 of the host vehicle V1 will proceeds to step S23, where the processing executed by the control unit 20 pauses for a prescribed period of time before returning to step S21. In step S23, the processing executed by the control unit 20 pauses for a prescribed period of time such as 100 ms before returning to step S21. However, if a message indicating a possible read-end collision has been received from a broadcast signal of the following vehicle V2 by the two-way wireless communications system 21 of the host vehicle V1, then the processing executed by the control unit 20 proceeds to step S24. In other words, if the control unit of the following vehicle V2 determines or predicts that a rear collision will likely occur from, then the host vehicle V1 will receive this indication or prediction and the processing executed by the control unit 20 of the host vehicle V1 will proceed to step S24.

In step S24, the control unit 20 is configured to send a confirmation message to the following vehicle V2 that the host vehicle V1 will switch from a regular broadcast channel to a high priority channel in response to the signal from the following vehicle V2. Once the host vehicle V1 sends the confirmation message to the following vehicle V2, the processing executed by the control unit 20 proceeds to step S25.

In step S25, the control unit 20 is configured to switch from the regular broadcast channel of the two-way wireless communications system 21 to a high priority channel, which the following vehicle V2 should now be using. Now the processing executed by the control unit 20 proceeds to step S26.

In step S26, the control unit 20 is also configured to send a full kinematics message which provides a complete set of information on the host vehicle V1 to the following vehicle V2. Thus, the on-board unit of the following vehicle V2 can now perform its countermeasures as need and/or desired. Now the processing executed by the control unit 20 proceeds to step S27.

In step S27, the control unit 20 is configured to determine if the signal including the full kinematics message has been received by the following vehicle V2. In particular, the on-board unit of the following vehicle V2 should send a signal with its MAC address and/or IP address together with a confirmation message to the host vehicle V1. The following vehicle V2 should also include a full kinematics message of following vehicle V2. If the host vehicle V1 does not receive this confirmation message with the full kinematics message from the following vehicle V2, then the control unit 20 repeats the process of step S26, i.e., resending the full kinematics message of the host vehicle V1. Once the host vehicle V1 receives the confirmation message a full kinematics message from the following vehicle V2, then the processing executed by the control unit 20 proceeds to step S28.

In step S28, the control unit 20 is configured to determine if an obstacle is present in front of the host vehicle V1 that would present a problem if the host vehicle V1 were accelerated in order to prevent a potential rear collision. If the control unit 20 of the host vehicle V1 determines that an obstacle is present in front of the host vehicle V1 that would present a problem if the host vehicle V1 were accelerated, then the processing executed by the control unit 20 is returns to the beginning and other countermeasures will be executed if needed and/or desired. However, if the control unit 20 of the host vehicle V1 determines that no obstacles are present in front of the host vehicle V1 that would present a problem if the host vehicle V1 were accelerated, then the processing executed by the control unit 20 proceeds to step S29.

In step S29, the control unit 20 is configured to open the main throttle valve 18 to accelerate the host vehicle V1 to a level that will be sufficient to avoid a rear collision based on the full kinematics messages of the host vehicle V1 and the following vehicle V2. Then, the processing executed by the control unit 20 returns to the beginning.

The communication component conducts a direct communications with other vehicles, including broadcasting vehicle parameter identifiers of a host vehicle equipped with the communication component and receiving vehicle parameter identifiers of a following vehicle. The rear collision predicting component predicts a likelihood of a potential rear collision event occurring in the host vehicle based on the vehicle parameter identifiers of the following vehicle. The acceleration countermeasure component accelerates the host vehicle in response to the rear collision predicting component predicting that the potential rear collision event is likely to occur with the following vehicle.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle pre-collision countermeasure system comprising:

a communication component configured to conduct a direct communications with other vehicles, including broadcasting vehicle parameter identifiers of a host vehicle equipped with the communication component and receiving vehicle parameter identifiers of a following vehicle;

a rear collision predicting component configured to predict a likelihood of a potential rear collision event occurring in the host vehicle based on the vehicle parameter identifiers of the following vehicle; and an acceleration countermeasure component configured to accelerate the host vehicle in response to the rear collision predicting component predicting that the potential rear collision event is likely to occur with the following vehicle, the communication component including a regular broadcast channel and a high priority channel with the communication component configured to use the regular broadcast channel prior to initially predicting that the potential rear collision event is likely to occur and to use the high priority channel after initially predicting that the potential rear collision event is likely to occur.

2. The vehicle pre-collision countermeasure system according to claim 1, further comprising a forward obstacle detection component configured to determine if an obstacle exists in front of the host vehicle; and a countermeasure prohibiting component configured to prohibit the acceleration countermeasure component from accelerating the host vehicle in response to the forward obstacle detection component determining that the obstacle exists in front of the host vehicle.

3. The vehicle pre-collision countermeasure system according to claim 1, wherein the communication component includes a wireless communication device.

4. The vehicle pre-collision countermeasure system according to claim 1, wherein the rear collision predicting component is further configured to use at least a following vehicle position and a following vehicle velocity as the vehicle parameter identifiers to predict that the potential rear collision event is likely to occur with the following vehicle.

5. The vehicle pre-collision countermeasure system according to claim 2, wherein the communication component includes a dedicated short-wave radio communication device.

6. The vehicle pre-collision countermeasure system according to claim 2, wherein the rear collision predicting component is further configured to use at least a following vehicle position and a following vehicle velocity as the vehicle parameter identifiers to predict that the potential rear collision event is likely to occur with the following vehicle.

7. The vehicle pre-collision countermeasure system according to claim 3, wherein the rear collision predicting component is further configured to use at least a following vehicle position and a following vehicle velocity as the vehicle parameter identifiers to predict that the potential rear collision event is likely to occur with the following vehicle.

8. A vehicle pre-collision countermeasure method comprising:

conducting direct two way communications between a preceding vehicle and a following vehicle in which the preceding and following vehicles transmit preceding and following vehicle parameter identifiers, respectively, to each other such that the preceding vehicle receives the following vehicle parameter identifiers;

predicting a likelihood of a potential rear collision event occurring in the preceding vehicle at least partially based on the following vehicle parameter identifiers received from the following vehicle during the two way communications; and accelerating the preceding vehicle based on a prediction that the potential rear collision event is likely to occur with the following vehicle, the conducting of the direct two way communications including using a regular broadcast channel prior to initially predicting that the potential rear collision event is likely to occur and using a high priority channel after initially predicting that the potential rear collision event is likely to occur.

9. The vehicle pre-collision countermeasure method according to claim 8, further comprising determining if an obstacle exist in front of the preceding vehicle; and prohibiting the acceleration of the preceding vehicle in response to the determining that the obstacle exist in front of the preceding vehicle.

10. The vehicle pre-collision countermeasure method according to claim 8, wherein the direct two way communications includes using a dedicated short-wave radio communication device.

11. The vehicle pre-collision countermeasure method according to claim 8, wherein the predicting of the likelihood of the potential rear collision event occurring includes using at least a following vehicle position and a following vehicle velocity as the vehicle parameter identifiers to predict that the potential rear collision event is likely to occur with the following vehicle.

12. The vehicle pre-collision countermeasure method according to claim 9, wherein the direct two way communications includes using a dedicated short-wave radio communication device.

13. The vehicle pre-collision countermeasure method according to claim 9, wherein the predicting of the likelihood of the potential rear collision event occurring includes using at least a following vehicle position and a following vehicle velocity as the vehicle parameter identifiers to predict that the potential rear collision event is likely to occur with the following vehicle.

14. The vehicle pre-collision countermeasure method according to claim 10, wherein the predicting of the likelihood of the potential rear collision event occurring includes using at least a following vehicle position and a following vehicle velocity as the vehicle parameter identifiers to predict that the potential rear collision event is likely to occur with the following vehicle.

15. A vehicle pine-collision countermeasure system comprising:

a communication component configured to conduct a direct communications with other vehicles, including broadcasting vehicle parameter identifiers of a host vehicle equipped with the communication component and receiving vehicle parameter identifiers of a following vehicle;

a rear collision predicting component configured to predict a likelihood of a potential rear collision event occurring in the host vehicle based on the vehicle parameter identifiers of the following vehicle; and an acceleration countermeasure component configured to accelerate the host vehicle in response to the rear collision predicting component predicting that the potential rear collision event is likely to occur with the following vehicle, the communication component including a regular broadcast channel and a high priority channel with the communication component configured to use the regular broadcast channel prior to initially predicting that the potential rear collision event is likely to occur and to use the high priority channel in response to and during initially predicting that the potential rear collision event is likely to occur, the communication component being further configured to send a request to the following vehicle for switching from the regular broadcast channel to the high priority channel in response to initially predicting that the potential rear collision event is likely to occur.

16. A vehicle pre-collision countermeasure method comprising:

conducting direct two way communications between a preceding vehicle and a following vehicle in which the preceding and following vehicles transmit preceding and following vehicle parameter identifiers, respectively, to each other such that the preceding vehicle receives the following vehicle parameter identifiers;

predicting a likelihood of a potential rear collision event occurring in the preceding vehicle at least partially based on the following vehicle parameter identifiers received from the following vehicle during the two way communications; and accelerating the preceding vehicle based on a prediction that the potential rear collision event is likely to occur with the following vehicle, the conducting of the direct two way communications incitiding using a regular broadcast channel prior to initially predicting that the potential rear collision event is likely to occur and using a high priority channel in response to initially predicting that the potential rear collision event is likely to occur, the conducting of the direct two way communications further including sending a request to the following vehicle for switching from the regular broadcast channel to the high priority channel in response to initially predicting that the potential rear collision event is likely to occur.

17. The vehicle pre-collision countermeasure system according to claim 5, wherein the dedicated short-wave radio communication device is configured to use dedicated short range communications (DSRC) in 5.9 GHz band.

18. The vehicle pre-collision countermeasure method according to claim 10, wherein the dedicated short-wave radio communication device is configured to use dedicated short range communications (DSRC) in 5.9 GHz band.

19. The vehicle pre-collision countermeasure system according to claim 1, wherein the acceleration countermeasure component is configured to output a signal to accelerate the host vehicle after initially predicting that the potential rear collision event is likely to occur.

20. The vehicle pre-collision countermeasure method according to claim 8, wherein the accelerating the preceding vehicle includes outputting a signal to accelerate the preceding vehicle after initially predicting that the potential rear collision event is likely to occur.

21. A vehicle pre-collision countermeasure system comprising:

a communication component configured to conduct a direct communications with other vehicles, including broadcasting vehicle parameter identifiers of a host vehicle equipped with the communication component and receiving vehicle parameter identifiers of a following vehicle; and a rear collision predicting component configured to predict a likelihood of a potential rear collision event occurring in the host vehicle based on the vehicle parameter identifiers of the following vehicle, the communication component including a regular broadcast channel and a high priority channel with the communication component configured to use the regular broadcast channel prior to initially predicting that the potential rear collision event is likely to occur and to use the high priority channel in response to and during initially predicting that the potential rear collision event is likely to occur.

22. The vehicle pre-collision countermeasure system according to claim 21, further comprising a vehicle parameter adjusting component configured to adjust a vehicle parameter of the host vehicle in response to the rear collision predicting component predicting that the potential rear collision event is likely to occur with the following vehicle.

23. The vehicle pre-collision countermeasure system according to claim 22, wherein the vehicle parameter adjusting component is an acceleration countermeasure component configured to accelerate the host vehicle in response to the rear collision predicting component predicting that the potential rear collision event is likely to occur with the following vehicle.

24. The vehicle pre-collision countermeasure system according to claim 23, further comprising a forward obstacle detection component configured to determine if an obstacle exists in front of the host vehicle; and a countermeasure prohibiting component configured to prohibit the acceleration countermeasure component from accelerating the host vehicle in response to the forward obstacle detection component determining that the obstacle exists in front of the host.

25. The vehicle pre-collision countermeasure system according to claim 21, wherein the communication component includes a wireless communication device.

26. The vehicle pre-collision countermeasure system according to claim 21, wherein the rear collision predicting component is further configured to use at least a following vehicle position and a following vehicle velocity as the vehicle parameter identifiers to predict that the potential rear collision event is likely to occur with the following vehicle.

27. The vehicle pre-collision countermeasure system according to claim 21, wherein the communication component includes a dedicated shortwave radio communication device.

28. The vehicle pre-collision countermeasure system according to claim 24, wherein the rear collision predicting component is further configured to use at least a following vehicle position and a following vehicle velocity as the vehicle parameter identifiers to predict that the potential rear collision event is likely to occur with the following vehicle.

29. The vehicle pre-collision countermeasure system according to claim 25, wherein the rear collision predicting component is further configured to use at least a following vehicle position and a following vehicle velocity as the vehicle parameter identifiers to predict that the potential rear collision event is likely to occur with the following vehicle.

30. A vehicle pre-collision countermeasure system comprising:

a communication component configured to conduct a direct communications with other vehicles, including broadcasting vehicle parameter identifiers of a host vehicle equipped with the communication component and receiving vehicle parameter identifiers of a following vehicle; and a rear collision predicting component configured to predict a likelihood of a potential rear collision event occurring in the host vehicle based on the vehicle parameter identifiers of the following vehicle, the communication component including a regular broadcast channel and a high priority channel with the communication component configured to use the regular broadcast channel prior to initially predicting that the potential rear collision event is likely to occur and to use the high priority channel in response to and during initially predicting that the potential rear collision event is likely to occur, the communication component being further configured to send a request to the following vehicle for switching from the regular broadcast channel to the high priority channel in response to initially predicting that the potential rear collision event is likely to occur.

31. The vehicle pre-collision countermeasure system according to claim 27, wherein the dedicated short-wave radio communication device is configured to use dedicated short range communications (DSRC) in 5.9 GHz band.

32. The vehicle pre-collision countermeasure system according to claim 22, wherein the vehicle parameter adjusting component is configured to output a signal to change the vehicle parameter of the host vehicle after initially predicting that the potential rear collision event is likely to occur.

33. The vehicle pre-collision countermeasure system according to claim 15, wherein the communication component is further configured to switch from the regular broadcast channel to the high priority channel after sending the request to the following vehicle for switching from the regular broadcast channel to the high priority channel.

34. The vehicle pre-collision countermeasure method according to claim 16, wherein the conducting of the direct two way communications further includes switching from the regular broadcast channel to the high priority channel after sending the request to the following vehicle for switching from the regular broadcast channel to the high priority channel.

35. The vehicle pre-collision countermeasure system according to claim 30, wherein the communication component is further configured to switch from the regular broadcast channel to the high priority channel after sending the request to the following vehicle for switching from the regular broadcast channel to the high priority channel.

36. The vehicle pre-collision countermeasure system according to claim 1, wherein the communication component is configured to use the high priority channel that enables the direct communications to be conducted at a faster rate than the regular broadcast channel.

37. The vehicle pre-collision countermeasure method according to claim 8, wherein the conducting of the direct two way communications further includes using the high priority channel that enables the direct two way communications to be conducted at a faster rate than the regular broadcast channel.

38. The vehicle pre-collision countermeasure system according to claim 21, wherein the communication component is configured to use the high priority channel that enables the direct communications to be conducted at a faster rate than the regular broadcast channel.

39. The vehicle pre-collision countermeasure system according to claim 1, wherein the communication component is further configured to send additional kinematics information of the host vehicle as well as the vehicle parameter identifiers of the host vehicle in response to initially predicting that the potential rear collision event is likely to occur.

40. The vehicle pre-collision countermeasure system according to claim 39, wherein the communication component is further configured to send the additional kinematics information of the host vehicle on the high priority channel.

41. The vehicle pre-collision countermeasure system according to claim 40, wherein the communication component is further configured to receive an additional kinematics information of the following vehicle, and the rear collision predicting component is further configured to use the additional kinematics information of the following vehicle to predict the likelihood of the potential rear collision event occurring in the host vehicle.

42. The vehicle pre-collision countermeasure method according to claim 8, wherein the conducting of the direct two way communications further includes sending additional kinematics information of the host vehicle as well as the vehicle parameter identifiers of the host vehicle in response to initially predicting that the potential rear collision event is likely to occur.

43. The vehicle pre-collision countermeasure method according to claim 42, wherein the conducting of the direct two way communications further includes sending the additional kinematics information of the host vehicle on the high priority channel.

44. The vehicle pre-collision countermeasure method according to claim 43, wherein the conducting of the direct two way communications further includes receiving an additional kinematics information of the following vehicle, and the predicting of the likelihood of the potential rear collision event occurring includes using the additional kinematics information of the following vehicle to predict the likelihood of the potential rear collision event occurring in the host vehicle.

45. The vehicle pre-collision countermeasure system according to claim 21, wherein the communication component is further configured to send additional kinematics information of the host vehicle as well as the vehicle parameter identifiers of the host vehicle in response to initially predicting that the potential rear collision event is likely to occur.

46. The vehicle pre-collision countermeasure system according to claim 45, wherein the communication component is further configured to send the additional kinematics information of the host vehicle on the high priority channel.

47. The vehicle pre-collision countermeasure system according to claim 46, wherein the communication component is further configured to receive an additional kinematics information of the following vehicle, and the rear collision predicting component is further configured to use the additional kinematics information of the following vehicle to predict the likelihood of the potential rear collision event occurring in the host vehicle.

* * * * *